(12) United States Patent
Dai et al.

(10) Patent No.: US 8,839,369 B1
(45) Date of Patent: Sep. 16, 2014

(54) METHODS AND SYSTEMS FOR DETECTING EMAIL PHISHING ATTACKS

(71) Applicant: Trend Micro Incorporated, Tokyo (JP)

(72) Inventors: Paul Dai, Nanjing (CN); Lidong Ma, Nanjing (CN); Shengfeng Ding, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 27 days.

(21) Appl. No.: 13/672,931

(22) Filed: Nov. 9, 2012

(51) Int. Cl.
*H04L 29/06* (2006.01)
*G06F 21/50* (2013.01)

(52) U.S. Cl.
CPC ............... *G06F 21/50* (2013.01); *H04L 63/10* (2013.01)
USPC ............ 726/3; 726/4; 726/22; 713/178

(58) Field of Classification Search
USPC ........................................... 726/3
See application file for complete search history.

(56) References Cited

U.S. PATENT DOCUMENTS

| | | | | |
|---|---|---|---|---|
| 7,021,534 B1 * | 4/2006 | Kiliccote | ....................... | 235/380 |
| 7,802,298 B1 | 9/2010 | Hong et al. | | |
| 8,332,947 B1 * | 12/2012 | Bregman et al. | ............... | 726/25 |
| 8,516,581 B2 * | 8/2013 | Hsu et al. | ........................ | 726/22 |
| 8,566,938 B1 * | 10/2013 | Prakash et al. | .................. | 726/22 |
| 2005/0160330 A1 * | 7/2005 | Embree et al. | .................. | 714/57 |
| 2006/0064374 A1 | 3/2006 | Helsper et al. | | |
| 2006/0070126 A1 | 3/2006 | Grynberg et al. | | |
| 2006/0101120 A1 | 5/2006 | Helsper et al. | | |
| 2006/0123464 A1 * | 6/2006 | Goodman et al. | ................ | 726/2 |
| 2006/0123478 A1 * | 6/2006 | Rehfuss et al. | ................ | 726/22 |
| 2006/0168066 A1 * | 7/2006 | Helsper et al. | ................ | 709/206 |
| 2007/0005984 A1 * | 1/2007 | Florencio et al. | ............. | 713/178 |
| 2007/0112814 A1 | 5/2007 | Chesshire | | |
| 2007/0282739 A1 | 12/2007 | Thomsen | | |
| 2008/0028444 A1 | 1/2008 | Loesch et al. | | |
| 2008/0082662 A1 | 4/2008 | Dandliker et al. | | |
| 2008/0148057 A1 * | 6/2008 | Hauw | ........................... | 713/185 |
| 2009/0089859 A1 * | 4/2009 | Cook et al. | ........................ | 726/3 |
| 2010/0235981 A1 * | 9/2010 | Jensen | ............................. | 4/628 |
| 2011/0225652 A1 * | 9/2011 | Emigh et al. | .................... | 726/22 |

OTHER PUBLICATIONS

Michael et al., "Attribute-based Prevention of Phishing Attacks", 2009, 1-4 pages.*

* cited by examiner

*Primary Examiner* — Kambiz Zand
*Assistant Examiner* — Yonas Bayou
(74) *Attorney, Agent, or Firm* — Okamoto & Benedicto LLP

(57) ABSTRACT

Detection of email phishing attacks is initiated when an email is received in a computer system. The email is parsed for features indicative of an email phishing attack, such as a link to an external website. The link to the website is followed to connect to and access the website. Fictitious information, such as fake user credentials or fake credit card information, is provided to the website. The response of the website to the fictitious information is evaluated to determine if the website is a phishing site. The website is deemed to be a phishing site when the website accepts the fictitious information as valid. The email is blocked to prevent its addressee from opening the email when the email is deemed part of a phishing attack, such as when it links to a phishing site.

19 Claims, 4 Drawing Sheets

METHODS AND SYSTEMS FOR DETECTING EMAIL PHISHING ATTACKS

BACKGROUND OF THE INVENTION

1. Field of the Invention

The present invention relates generally to computer security, and more particularly but not exclusively to detection of email phishing attacks.

2. Description of the Background Art

Various financial transactions may be performed over the Internet. Examples of these financial transactions include online banking, sending or receiving of payments for product purchases (e.g., use of PayPal™ system), credit card purchases, and so on. Unfortunately, the convenience of performing online financial transactions over the Internet not only attracts legitimate users but fraudsters as well.

Fraudsters gain access to online financial accounts of their victims using a variety of techniques including by "phishing." Phishing is a kind of social engineering that involves some form of misrepresentation. In an email phishing attack, the victim receives an email falsely claiming to be from the victim's financial institution. The email is made to look convincingly real, oftentimes complete with the look and feel of emails from the financial institution. The email includes a link to the fraudster's website, also referred to as "phishing site," that serves a web page where the victim enters confidential financial account information (e.g., login ID, password, credit card information) thinking he is providing the information to his financial institution. The web page from the phishing site, like the email linking to it, is made to look authentic.

Currently employed techniques for protecting users from email phishing attacks include use of spam filters and web reputation service. A spam filter blocks emails that have characteristics of phishing. However, spam filters are not entirely effective because of the vast number of readily available tools that a fraudster may use to bypass statistical and rule based spam filters. A web reputation service maintains a database of network locations (e.g., uniform resource locators) of known phishing sites. The database serves as a blacklist that may be consulted to determine if a link included in an email is to a known phishing site. Unfortunately, phishing sites are easily relocated, making it difficult to keep track of their current locations. To compound the problem, it is difficult to maintain the database given the increasing number of phishing sites.

SUMMARY

In one embodiment, detection of email phishing attacks is initiated when an email is received in a computer system. The email is parsed for features indicative of an email phishing attack, such as a link to an external website. The link to the website is followed to connect to and access the website. Fictitious information, such as fake user credentials or fake credit card information, is provided to the website. The response of the website to the fictitious information is evaluated to determine if the website is a phishing site. The website is deemed to be a phishing site when the website accepts the fictitious information as valid. The email is blocked to prevent its addressee from opening the email when the email is deemed part of a phishing attack, such as when it links to a phishing site.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
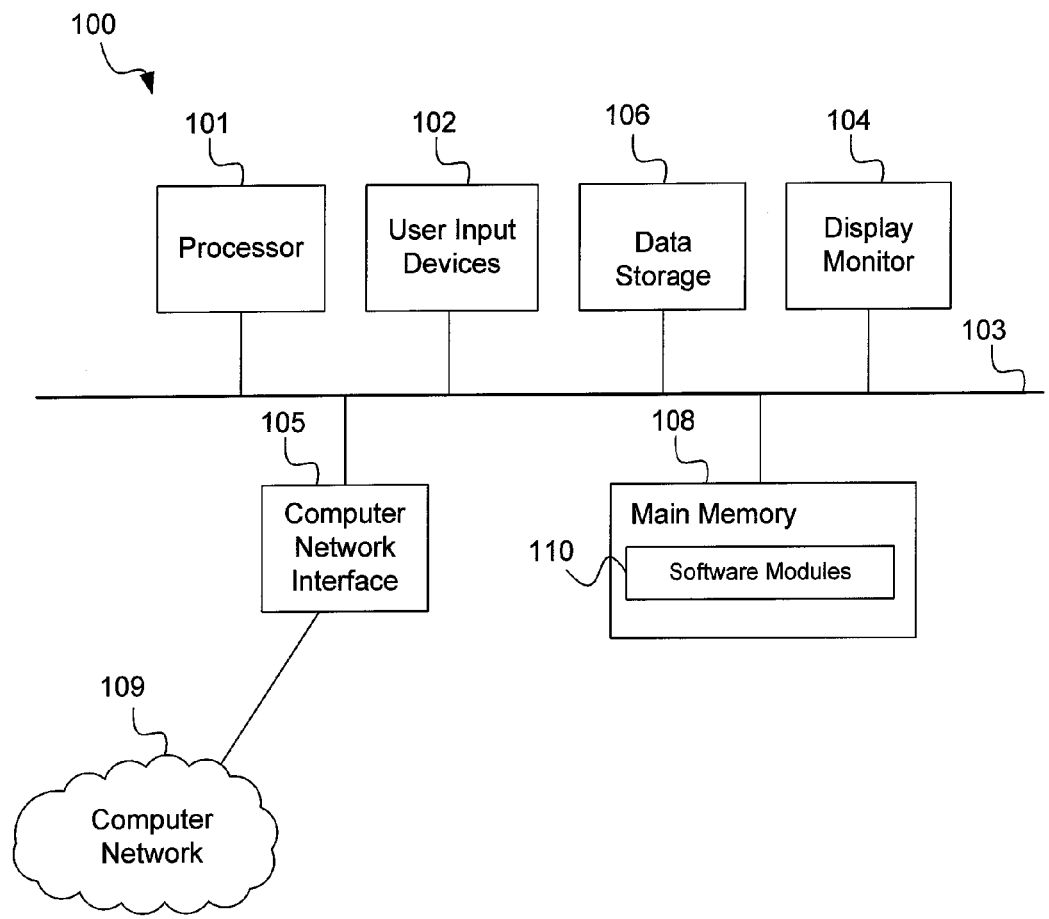
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise an email module (e.g., an email server, email client, mail transfer agent, or mail user agent) and a phishing detector.

The computer 100 may be configured to perform its functions by executing the software modules 110. The software modules 110 may be loaded from the data storage device 106 to the main memory 108. An article of manufacture may be embodied as computer-readable storage medium including instructions that when executed by a computer causes the computer to be operable to perform the functions of the software modules 110.

Figure 2:
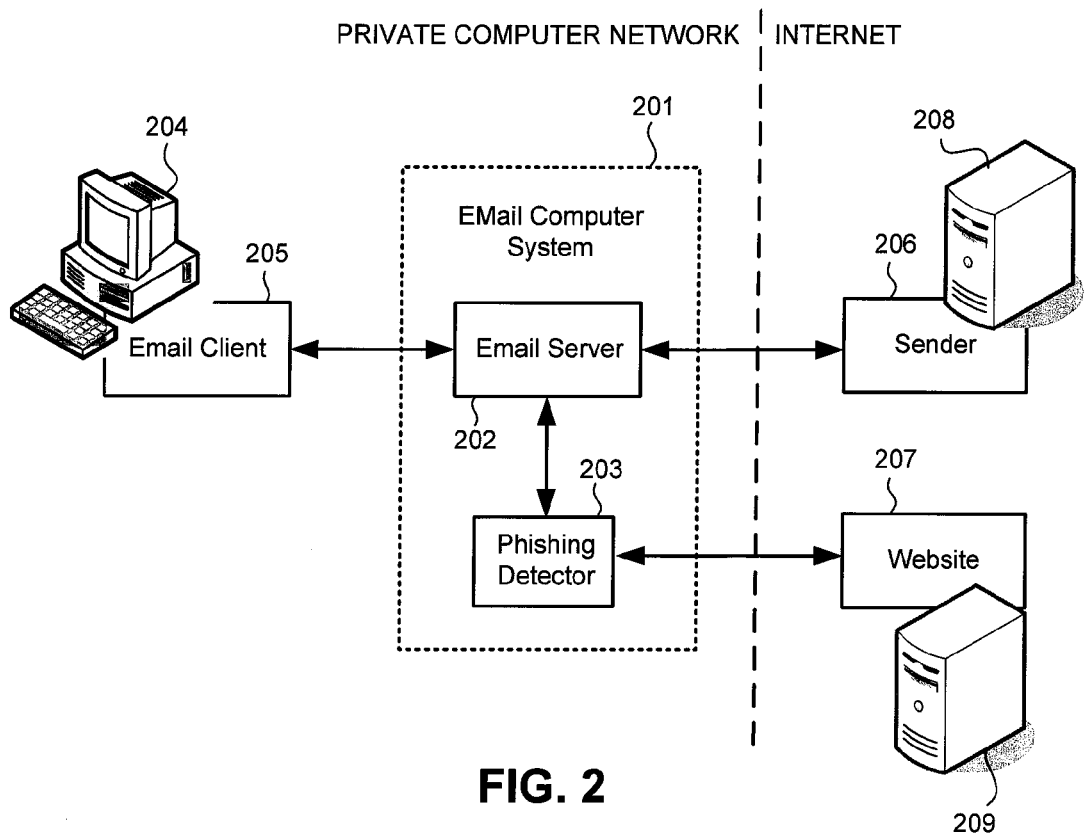
FIG. 2 shows a schematic diagram of a system for detecting email phishing attacks in accordance with an embodiment of the present invention.

FIG. 2 shows a schematic diagram of a system for detecting email phishing attacks in accordance with an embodiment of the present invention. In the example of FIG. 2, the system includes a user computer system 204 and an email computer system 201. The email computer system 201 may comprise one or more computers for sending and receiving emails. The user computer system 204 and the email computer system 201 may belong to a private computer network. Computers within the private computer network may receive emails over the Internet. In the example of FIG. 2, emails from a sender 206 are first received by the email computer system 201, which forwards the emails to their addressees in corresponding user computer systems 204. The sender 206 may comprise another e-mail server, a mail transfer agent, or a mail user agent, for example, hosted by an e-mail computer system 208.

In the example of FIG. 2, the email computer system 201 comprises a phishing detector 203 and an email module in the form of an email server 202. In other embodiments, the phishing detector 203 is employed with other email modules, such as an email client, mail transfer agent, or a mail user agent. In general, the phishing detector 203 may be employed with email modules to detect whether or not a received email is part of an email phishing attack. The detection is performed before the addressee opens the email.

In one embodiment, the phishing detector 203 comprises computer-readable program code for detecting email phishing attacks. The phishing detector 203 may be implemented as a plug-in to an email module, a stand-alone module separate from the email module, or integrated with the email module. The phishing detector 203 may parse an email for a link to an external network location, such as an HTML (hypertext markup language) link to a website. The link may comprise a uniform resource locator (URL) or other network location information of the website, for example. The email module, which is the email server 202 in the example of FIG. 2, may instead parse the email for the link and provide the link to the phishing detector 203. The email may also be parsed by other modules (e.g., spam filter), which passes the link to the phishing detector 203.

The phishing detector 203 follows the link to connect to and access the website. The phishing detector 203 analyses responses from the website to determine if the website is a phishing site. In one embodiment, the phishing detector 203 provides fictitious information to the website (e.g., fictitious user credentials, fictitious credit card information) and checks whether or not the website accepts the fictitious information as valid. The phishing detector 203 may deem the website as a phishing site when it accepts the fictitious information as valid. Otherwise, when the website does not accept the fictitious information as valid, the phishing detector 203 deems the website to be legitimate. The phishing detector 203 provides the result of its evaluation of the website to the email module. The email module may block the email if the result indicates that the email links to a phishing site.

In the example of FIG. 2, an email source in the form of a sender 206 sends an email to an addressee of the email whose computer system is located within the private computer network. The email server 202 receives the email and consults with the phishing detector 203 to determine whether or not the email is part of an email phishing attack. In the example of FIG. 2, the email includes a link to a website 207 hosted by a web server computer system 209. The web server computer system 209 may comprise one or more computers for hosting the website 207, which may or may not be a phishing site. The phishing detector 203 evaluates whether or not the website 207 is a phishing site and provides the result of its evaluation to the email server 202. If the result of the evaluation indicates that website 207 is not a phishing site, indicating that the email is not part of a phishing attack, the email server 202 allows the email to be forwarded to its addressee. In the example of FIG. 2, the addressee is the user of the user computer system 204. The addressee uses the email client 205 to receive the email from the e-mail server 202. Otherwise, the email server 202 blocks the email if the result of the evaluation indicates that the email is part of a phishing attack.

Figure 3:
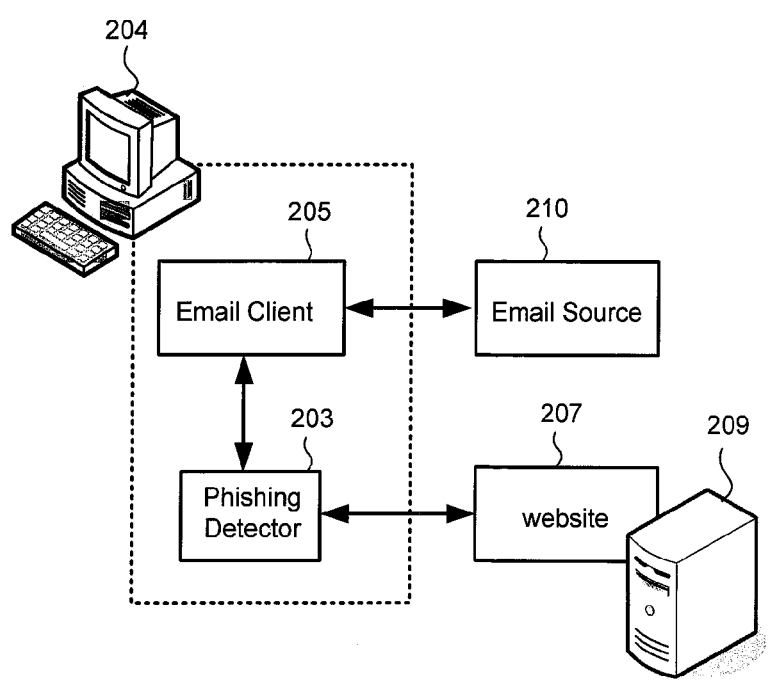
FIG. 3 schematically shows a phishing detector being deployed in an addressee's computer system, instead of in an intermediate computer system, in accordance with an embodiment of the present invention.

FIG. 3 schematically shows the phishing detector 203 being deployed in the addressee's computer system, instead of in an intermediate computer system, in accordance with an embodiment of the present invention. In the example of FIG. 3, the phishing detector 203 works in conjunction with an email module comprising an email client 205 instead of the email server 202. The operation of the phishing detector 203 remains the same in this configuration. More particularly, the email client 205 receives an email from an email source 210, which may be the e-mail server 202, the sender 206, or other email source. The email client 205 consults with the phishing detector 203 to determine whether or not the email is part of an email phishing attack. In the example of FIG. 3, the email includes a link to the website 207 hosted by the web server computer system 209. The phishing detector 203 receives the link from the email client 205, either by receiving the email and parsing the email for the link or by receiving the link from the email client 205, which parses the email for the link. The phishing detector 203 follows the link to evaluate the website 207 for phishing and provides the result of its evaluation to the email client 205. As before, the email client 205 may or may not block the email depending on the result of the evaluation. For example, the email client 205 may block the email if the email is deemed to be part of a phishing attack.

Figure 4:
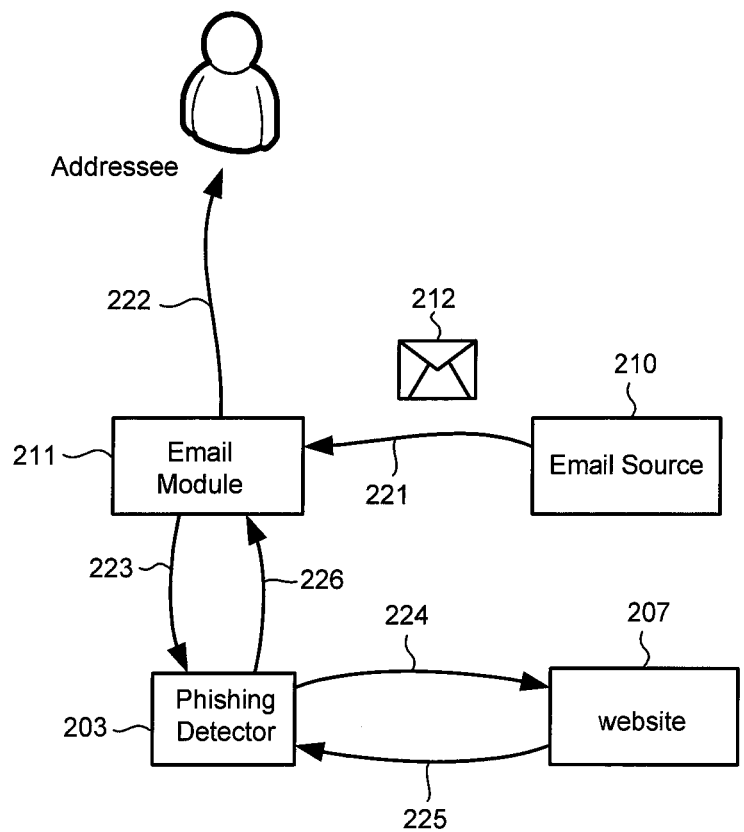
FIG. 4 schematically illustrates a method of detecting email phishing attacks in accordance with an embodiment of the present invention.

FIG. 4 schematically illustrates a method of detecting email phishing attacks in accordance with an embodiment of the present invention. In the example of FIG. 4, an email module 211 receives an email 212 from an email source 210 over a computer network (see arrow 221). The email module 211 may comprise an email server, an email client, a mail transfer agent, or a mail user agent, for example. When the email 212 does not have features indicative of phishing attacks, such as a reference to an external website or an HTML form, the email module 211 allows the email 212 to be viewed by its addressee (see arrow 222). For example, when the email 212 does not have features indicative of a phishing attack and the email module 211 comprises an email module in an intermediate email computer system (e.g., an email server mail transfer agent, or mail user agent), the email module 211 may allow the email 212 to be forwarded towards an email client running in a separate computer system employed by the addressee. As another example, when the email 212 does not have features indicative of a phishing attack and the email module 211 comprises an email client, the email module 211 may allow the email 212 to be opened by the addressee.

In the example of FIG. 4, the email 212 includes a link to the website 207. Accordingly, the email module 211 consults with the phishing detector 203 to determine whether or not the email 212 is part of an email phishing attack (see arrow 223). The email module 211 may parse the email 212 for the link and provide the link to the phishing detector 203. The email module 211 may also forward the email 212 to the phishing detector 203, which parses the email 212 for the link.

In one embodiment, to detect a phishing attack, the phishing detector 203 follows the link to connect to and access the website 207 (see arrow 224). In one embodiment, the phishing detector 203 connects to the website 207 by HTTP (hypertext transfer protocol) using a session different from that employed by the email module 211 to receive the email 212.

The phishing detector 203 receives one or more responses from the website 207 and evaluates the responses to determine whether or not the website 207 is a phishing site (see arrow 225).

In one embodiment, the phishing detector 203 may send the website 207 a "fake response" that mimics the action of a potential victim. For example, the phishing detector 203 may receive a webpage served by the website 207, parse the webpage for fields for entering user information (e.g., password and account name, credit card number), and enter fictitious information in the fields. The phishing detector 203 may deem the website 207 as a phishing site when the website 207 accepts the fictitious information as valid. For example, the phishing detector 207 may parse a response from the website 207 and look for texts indicative of proper information entry, such as "input accepted", "login complete" etc. to determine if the website 207 accepted the fictitious information as valid. It is to be noted that a typical phishing site does not know whether or not entered information is valid; a phishing site indiscriminately harvests entered information. The phishing detector 203 takes advantage of this flaw in phishing sites, and uses it to distinguish legitimate websites from phishing sites. Continuing the above example, when the website 207 does not accept the fictitious information as valid, the phishing detector 207 deems the website 207 to be a legitimate website.

The phishing detector 203 provides the result of its evaluation of the website 207 to the email module 211 (see arrow 226). The email module 211 may block the email 212 from being received and opened by the addressee when the evaluation of the website 207 indicates that the website 207 is a phishing site, i.e., the email 212 is part of an email phishing attack because it links to a phishing site. Otherwise, the email module 211 may allow the email 212 to be received and opened by the addressee when the evaluation of the website 207 indicates that it is not a phishing site.

Figure 5:
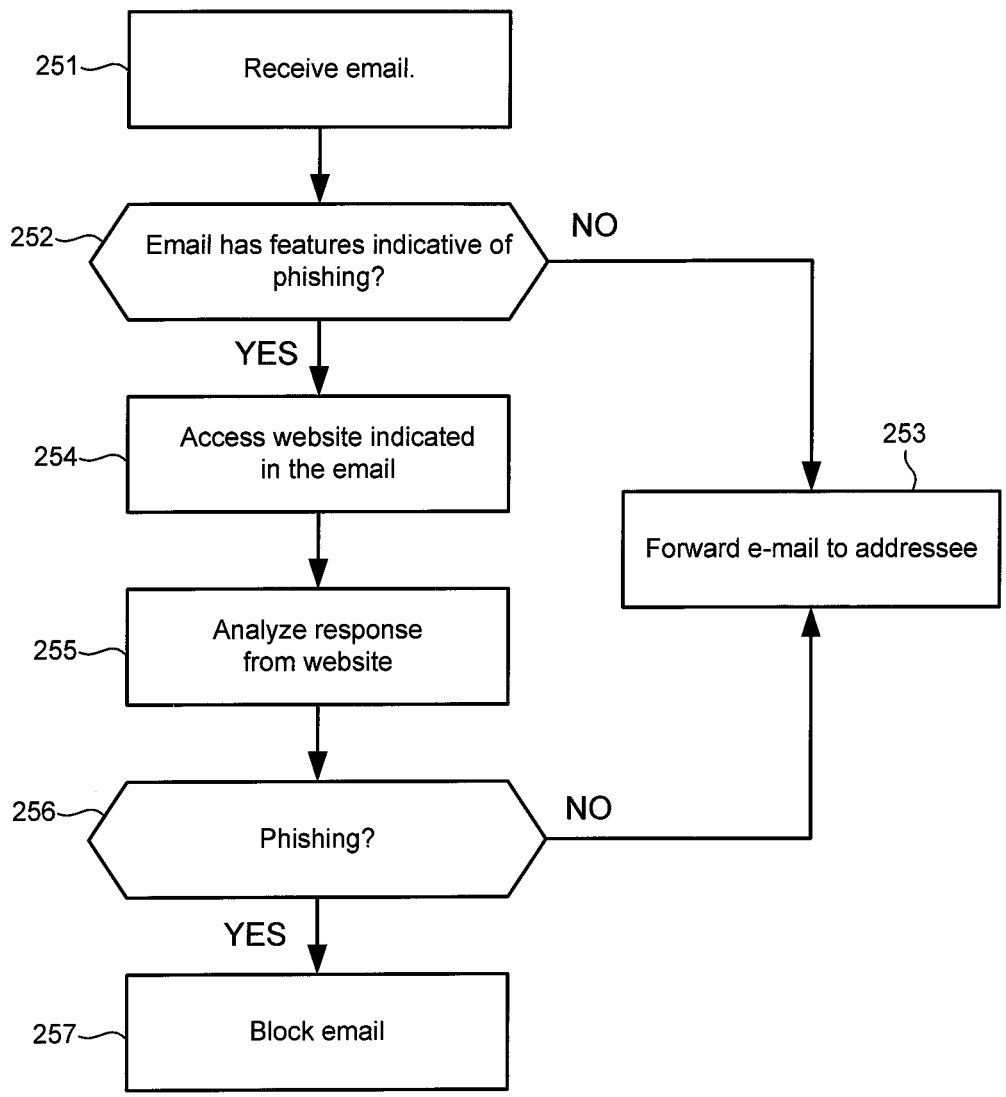
FIG. 5 shows a flow diagram of a method of detecting email phishing attacks in accordance with an embodiment of the present invention.

FIG. 5 shows a flow diagram of a method of detecting email phishing attacks in accordance with an embodiment of the present invention. The method of FIG. 5 may be performed by the components of FIGS. 2-4. Other components may also be employed without detracting from the merits of the present invention.

In the method of FIG. 5, an email module receives an email from a sender (step 251). The email is inspected for features indicative of a phishing attack (step 252). For example, the email may be parsed to check the email for a link to an external website hosted by a web server computer system or for an HTML form. The inspection of the email for features indicative of a phishing attack may be performed by the email module, a phishing detector, or some other module. The email module simply allows the email to be forwarded to its addressee when the email does not have features indicative of a phishing attack (step 252 to step 253). Otherwise, when the email has at least one feature indicative of a phishing attack, the phishing detector proceeds to evaluate the email for phishing (step 252 to step 254).

In one embodiment, to evaluate the email for phishing, the phishing detector accesses the website indicated in the email (step 254). For example, the phishing detector may follow the link included in the email to connect to and communicate with the website. The phishing detector may imitate the expected response of the addressee to the email, such as by providing fictitious credentials, fictitious confidential information, or other fictitious information to the website. For example, the phishing detector may enter a fictitious password and fictitious user account name to a webpage served by the website when the webpage has fields for entering a password and account name. As another example, the phishing detector may enter fictitious credit card information to the webpage served by the website when the webpage has a field for entering credit card information. The phishing detector may also parse the webpage for other input fields and enter corresponding fictitious information to mimic the actions of a real user falling for the phishing scam.

The response of the website is analyzed to determine whether or not the website is a phishing site (step 255). In one embodiment, the phishing detector parses a webpage served by the website to determine if the website accepted as valid the fictitious information provided by the phishing detector. If the website accepted the fictitious information as valid, e.g., by providing a successful login webpage, the phishing detector deems the website to be a phishing site because the fictitious information is not real and not associated with any real account or user. Because the fictitious information is solely for testing for phishing sites and the website accepts the fictitious information as valid, the website is detected to be a phishing site that indiscriminately collects information from users. The phishing detector indicates to the email module that the email is part of an email phishing attack when the website is deemed to be a phishing site. Otherwise, when the website is not deemed to be a phishing site, the phishing detector indicates to the email module that the email is not part of an email phishing attack.

The email is blocked by the email module when the email is part of an email phishing attack as deemed by the phishing detector (step 256 to step 257). Otherwise, when the email is not part of a phishing attack, the email module allows the email to be forwarded to its addressee (step 256 to step 253).

Methods and systems for detecting email phishing attacks have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting an email phishing attack, the method comprising:
   receiving an email that is addressed to a user in a first computer system;
   the first computer system parsing the email for a link to a website;
   the first computer system following the link parsed from the email to connect to a web server computer system hosting the website before forwarding the email to the user;
   the first computer system providing fictitious information to the website;
   the first computer system determining whether or not the website is a phishing site based on whether or not the website accepts the fictitious information as valid; and
   the first computer system forwarding the email to the user to allow the user to open the email when the website is determined to be not a phishing site based on the website not accepting the fictitious information as valid.

2. The method of claim 1 wherein the fictitious information comprises a fictitious password.

3. The method of claim 1 wherein the fictitious information comprises a fictitious credit card information.

4. The method of claim 1 wherein the first computer system comprises an email computer system comprising an email server that receives the email.

5. The method of claim 1 wherein the first computer system comprises a user computer system comprising an email client that receives the email.

6. The method of claim 1 further comprising:
checking the email for features indicative of an email phishing attack.

7. The method of claim 1 wherein the email is received from a second computer system.

8. The method of claim 1 wherein the second computer system comprises an email computer system that hosts an email server.

9. A system for detecting email phishing attacks, the system comprising:
a first computer system that receives from an email source an email that is addressed to a user, parses the email for a link to a website, follows the link parsed from the email to access the website before forwarding the email to the user, provides fictitious information to the website, determines whether or not the email is part of an email phishing attack based on whether or not the website accepts the fictitious information as valid, forwards the email to the user to allow the user to open the email when the website does not accept the fictitious information as valid, and prevents the email from being opened by the user when the website accepts the fictitious information as valid.

10. The system of claim 9 further comprising:
a second computer system that runs an email client and receives the email from the first computer system when the email is not part of an email phishing attack.

11. The system of claim 9 wherein the first computer system comprises a user computer system that runs an email client with a phishing detector.

12. The system of claim 9 wherein the first computer system comprises an email computer system that runs an email server with a phishing detector.

13. A method of detecting email phishing attacks, the method comprising:
receiving an email that is addressed to a user over a computer network;
parsing the email for a link to a website;
following the link parsed from the email to connect to a web server computer system hosting the website before forwarding the email to the user;
providing fictitious information to the website;
determining whether or not the website is a phishing site based on whether or not website accepts the fictitious information as valid;
forwarding the email to the user to allow the user to open the email when the website does not accept the fictitious information as valid; and
preventing the email from being opened by the user when the website accepts the fictitious information as valid.

14. The method of claim 13 wherein the fictitious information comprises a fictitious password.

15. The method of claim 13 wherein the fictitious information comprises a fictitious credit card information.

16. The method of claim 13 further comprising:
checking the email for features indicative of an email phishing attack.

17. The method of claim 13 further comprising:
blocking the email when the website is detected to be a phishing site.

18. The method of claim 13 further comprising:
forwarding the email to another computer when the website is detected to be not a phishing site.

19. The method of claim 18 wherein the other computer is a user computer of the user.

* * * * *